I. KSIAŻEK.
AUTOMATIC SAFETY CAR FENDER.
APPLICATION FILED JULY 23, 1909.

965,199.

Patented July 26, 1910.
2 SHEETS—SHEET 1.

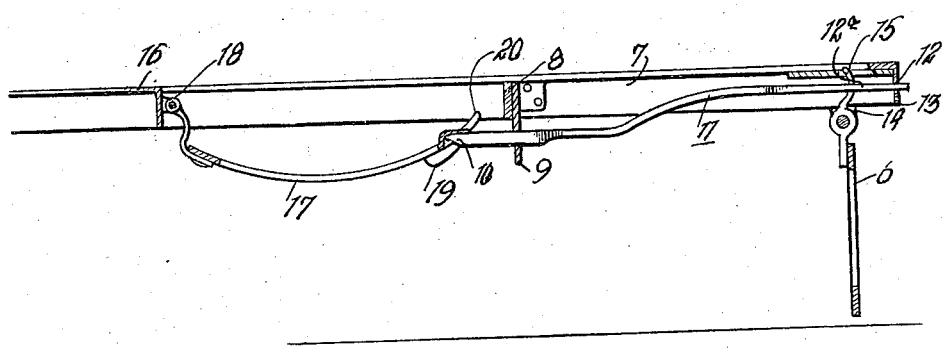
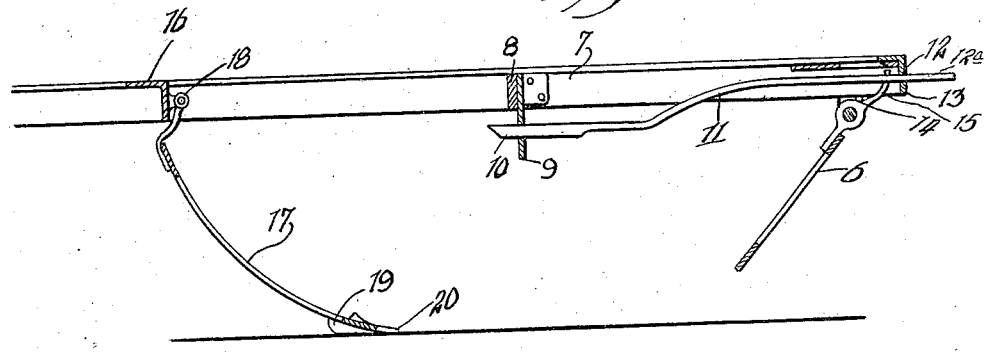

UNITED STATES PATENT OFFICE.

IGNACY KSIAŽEK, OF CHICAGO, ILLINOIS, ASSIGNOR OF ONE-HALF TO FRANK W. KORALESKI, OF CHICAGO, ILLINOIS.

AUTOMATIC SAFETY CAR-FENDER.

965,199.  Specification of Letters Patent.  Patented July 26, 1910.

Application filed July 23, 1909. Serial No. 509,147.

*To all whom it may concern:*

Be it known that I, IGNACY KSIAŽEK, a citizen of the United States, residing at Chicago, in the county of Cook and State of Illinois, have invented certain new and useful Improvements in Automatic Safety Car-Fenders, of which the following is a specification.

This invention relates to improved automatic safety car fender, and has for its essential object to provide a device with an auxiliary automatic safety attachment, as hereinafter more fully set forth.

The invention consists in the features of construction and combination of parts hereinafter described and claimed.

Figure 1:
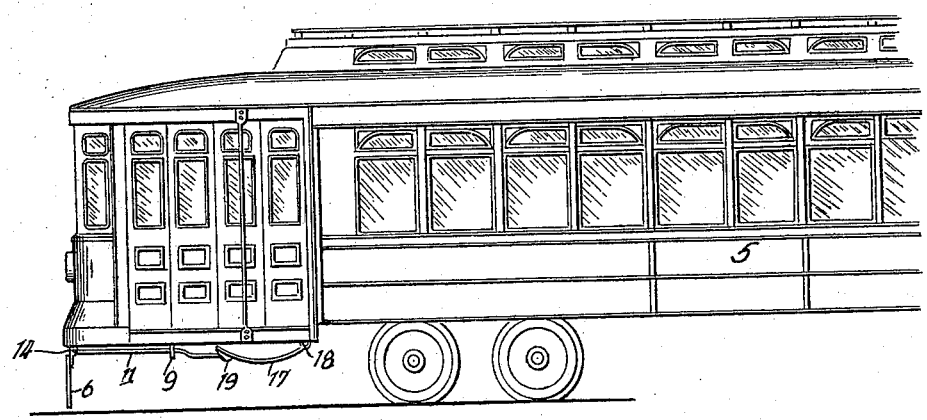
Figure 2:
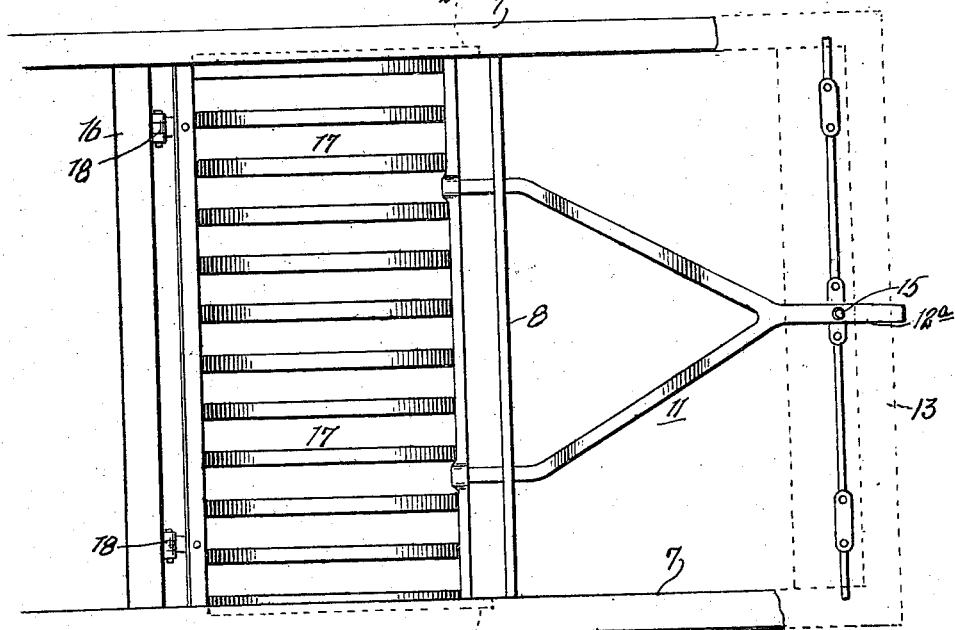

In the drawings, Figure 1 is a side elevation of a passenger car equipped with this improved automatic safety fender; Fig. 2, a top or plan view of said device; Fig. 3, a side elevation thereof, showing the automatic safety attachment in normal, raised position; and Fig. 4, a side elevation showing the fender acted upon, causing the automatic safety attachment to assume its lower, operative position.

This improved automatic safety fender is applicable more especially for use in city and interurban street-cars, although it can be used elsewhere as desired. As indicated in Fig. 1, said device is fixedly secured at the respective ends of the passenger car 5, said device comprising an outer movable fender guard 6 normally in lowered position. To the opposite bottom car floor beams 7 is secured an intermediate, transverse bar 8, having formed on its lower sides suitable hangers 9 for engaging the inner ends 10 of a movable frame 11, which is illustrated as a substantially Y-formation, its outer end traveling within a suitable guideway 12 formed in the end supporting car beam 13. The outer movable fender guard 6, as shown, is pivotally mounted between the outwardly projecting ears 14, of a bracket fastened to the car frame. The forward end 12ª of the movable frame, as best shown in Figs. 3 and 4, engages a curved finger 15 connected to the movable fender 6, so that when the same is actuated the frame 11 will be rocked forward as the fender moves inwardly. A transverse supporting beam 16 is positioned beneath the car body a suitable distance rearwardly of said movable frame, for permitting an auxiliary safety fender 17 to be hinged thereto at its upper end 18, said auxiliary safety fender being preferably formed from suitable metal, having its lower outwardly curved end 19 weighted and provided with forwardly extending fingers 20.

In use, the outer movable car fender 6 is in the normal, downward position shown at Fig. 3, it being understood that its automatic auxiliary safety attachment is in raised position. When an object is encountered, the outer movable fender 6 will be thrown inwardly, as indicated in Fig. 4, actuating the movable frame 11 forwardly and automatically releasing the auxiliary safety fender 17, whose outer weighted ends 19 cause the same to instantly descend into lowermost position ready to catch the object beneath the car. To the outer opposite fingers 20 may be secured chains, ropes or other means for raising the same into upper, normal position from within the car, it being intended that a suitable guide or indicator be placed in convenient location for the car men to ascertain whether the device is in normal position.

Although I have described the construction of the device with some particularity, it is to be understood that the same may be constructed in various ways without departing from its principle of operation.

Without limiting myself to the aforesaid construction, I claim:

1. An automatic safety car fender having an outer movable fender, an inner auxiliary fender normally in raised position, and a movable frame having its inner beveled ends in normal engagement with the auxiliary safety fender, and having its outer frame end in slidable engagement with the end supporting car beam, the outer end engaging a finger on the outer movable fender so that when the latter is actuated inwardly the movable frame will be rocked forwardly, releasing the inner auxiliary safety fender, substantially as described.

2. An automatic safety car fender comprising an outer movable fender, an inner auxiliary safety fender, a transverse brace between said fenders provided with hangers, a movable frame having its inner ends traveling within said hangers and its outer end in slidable engagement with the end-supporting car beam, means connecting the outer movable fender with said frame so that when the same is actuated the frame will be moved, causing the inner auxiliary safety fender to be automatically released, instantly assuming a lowered position, substantially as described.

IGNACY KSIAŽEK.

Witnesses:
   Isaac Doff,
   Stanislaus Stylinski.